2 Sheets—Sheet 1.
S. WHITE.
PREPARING ILLUMINATING GASES.
No. 7,043. Patented Jan. 22, 1850.
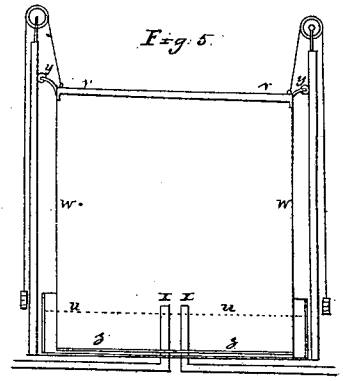
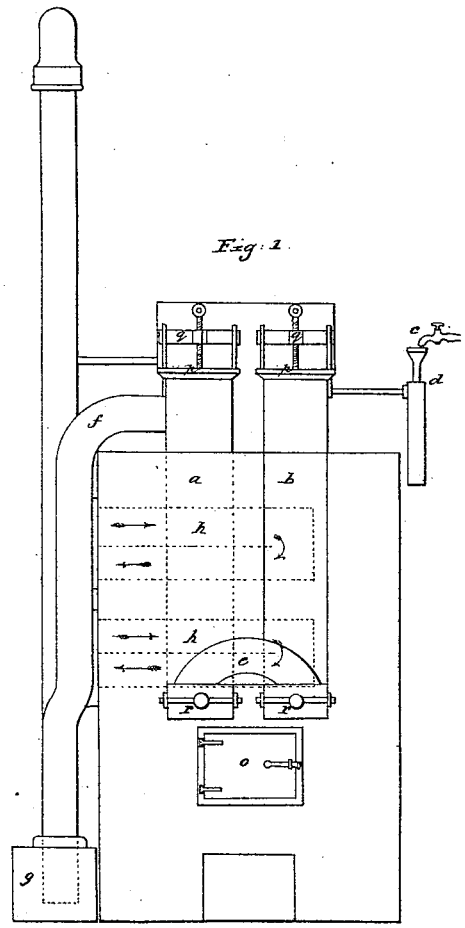
Witnesses:
Inventor:

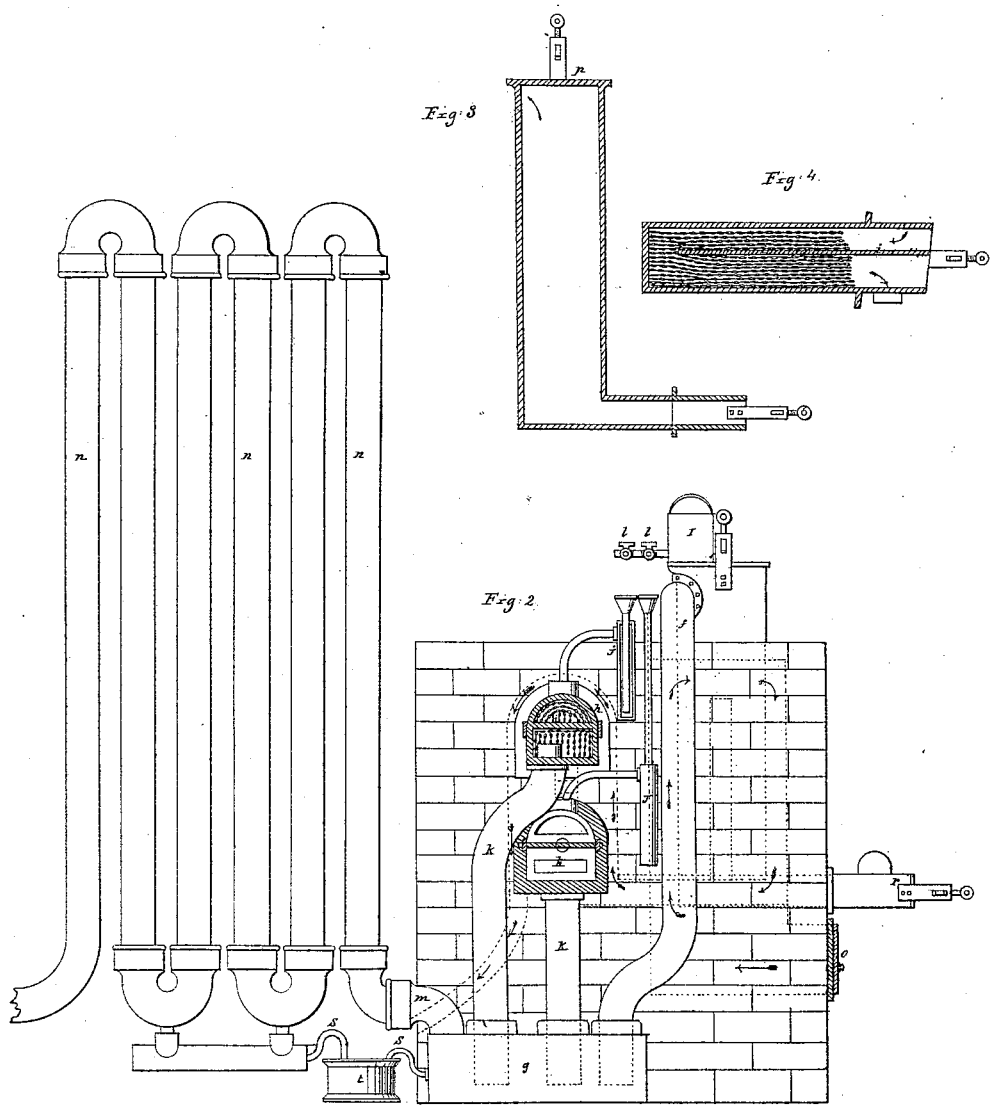

UNITED STATES PATENT OFFICE.

STEPHEN WHITE, OF MANCHESTER, ENGLAND.

PREPARING ILLUMINATING GASES.

Specification of Letters Patent No. 7,043, dated January 22, 1850.

*To all whom it may concern:*

Be it known that I, STEPHEN WHITE, of Manchester, in the county of Lancaster, England, gas-engineer, a subject of the Queen of Great Britain, have invented Improvements in the Manufacture of Gas for Illumination and in Apparatus Employed Therein; and I do hereby declare that the following is a full and exact description of my said invention (that is to say,)—

My improvements in the manufacture of gas for illumination and in apparatus employed therein consist first in decomposing water by bringing it into contact in the manner hereinafter described with charcoal coke or anthracite coal and small thin plates of iron or small pieces of iron turnings or iron wires at a high temperature and thereby producing from such combination of materials so treated, hydrogen gas, oxid of carbon gas, and carbureted hydrogen gas mixed and afterward in combining such compound gas with such carbureted hydrogen gas as may contain a large proportion of olefiant gas, produced by bringing oil or fat, or resin or certain other substances hereinafter designated or described in contact with heated materials, or with carbureted hydrogen produced from certain kinds of pit coal so as to produce ultimately a compound gas, composed of hydrogen gas, oxid of carbon gas and carbureted hydrogen gas mixed together, which compound gas is fitted for the purpose of illumination and secondly, my said invention consists, so far as it relates to the apparatus used, in certain particular apparatus hereinafter described in reference to the plan or drawing hereto annexed.

I will now proceed to describe generally the whole apparatus used and the process followed by me in carrying my said invention into effect.

In the drawing accompanying these presents Figure 1, represents a front view of the entire apparatus showing the retorts intended for the decomposition of water. Fig. 2, a side view showing the retorts intended for the decomposition of resin, fats, oils, or such like materials. Fig. 3, is a section of a retort for the decomposition of water. Fig. 4, a section of a retort for the decomposition of resins, oils, fats, or certain kinds of pit coals hereinafter particularly described or designated. Fig. 5, a gas holder.

$a$, $b$, in Fig. 1, of the drawings hereto annexed represent two cylinders or retorts made either of good fire clay or cast iron placed perpendicularly and supported by fire tiles or brick work over the furnace. The cylinders or retorts $a$, and $b$, are filled to the top as shown in Fig. 3, with charcoal or coke or anthracite coal and iron plates, iron turnings or iron wires the charcoal or coke or anthractite coal being broken in small pieces and mixed with the iron in the proportion of one pound of iron to six pounds of charcoal, coke or anthracite coal, which materials are intended for the decomposition of water.

$c$, is a cock leading from any convenient vessel containing water which is caused to pass in a rapid succession of drops or in a small stream according to the size of the retort used regulated also by the cock $c$, through the siphon tube $d$, into the retort $b$ Fig. 1. The water is conveyed through the said pipe and falls on the heated materials, charcoal or coke or anthracite coal and iron plates iron turnings or iron wire contained in the retort by means of which it is converted into vapor and such vapor having no outlet at the upper end of the retort (which is closed as hereinafter described) penetrates and passes through the whole body of such before mentioned materials contained in the retorts down to the bottom of the said retort when it is allowed to escape through the connecting tube $e$, Fig. 1, into the next retort $a$, to rise therein through the charcoal or coke or anthracite coal and iron plates iron turnings or iron wires contained in the said cylinder or retort $a$. The vapor disengaged from the water in the retort $b$ as aforesaid becomes connected by passing through the contents into a compound gas composed of hydrogen gas, oxid of carbon gas and carbureted hydrogen gas, combined together the effect of the iron plates, iron turnings, or iron wires is to prevent the formation of carbonic acid gas, the iron at a red heat having a great affinity for the oxygen of the carbonic acid which may result from any of the carbons employed by being brought in contact with the vapor of water.

The next stage of the process is to allow the compound gas so produced to pass out by means of the exit tube $f$, $f$, Figs. 1, and 2, into the hydraulic main $g$, $g$, Figs. 1, and 2, where the mixture of the hydrogen gas, oxid of carbon gas, carbureted hydrogen gas, with the heavy carbureted hydrogen gas takes place. The heavy carbureted hydrogen gas is produced in the horizontal retorts $h$, $h$, Fig. 2, in manner following that is to say, the vessel I (see Fig. 2,) contains resin, oil, fat, tallow or common tar or some other substance of a similar character which decomposed by a high temperature gives out heavy carbureted hydrogen gas in large quantities and containing a large amount of olefiant gas.

I shall describe the process as conducted with resins oils or fats which are the three substances I propose principally to use. The resin, oils or fats should be kept in the vessel (I) in a liquid state by being placed on the top of the two hydrogen retorts and should flow therefrom in a small continued stream regulated by the cocks $l$ $l$ Fig. 2 through the siphon pipes $j$. $j$. into the retorts $h$. $h$. where it falls on the center division of the retorts as shown at $i$. $i$. Figs. 2 and 4. This central division divides the retorts into two compartments running from the mouth of the retort to within four inches of the back and is made secure by means of the door, bolt and screws and luting. The retorts $h$. $h$. Figs. 1. and 2. are nearly filled with small iron chains arranged as shown in the section of retort Fig. 4. (I prefer iron or copper chains being used but any other metals capable of sustaining a white-red heat may be used, or instead of iron or copper chains pieces of iron or copper wire or iron turnings or such like similar shaped metal, the object being to offer an ignited slightly resisting medium without interfering with the passage of the gas through the retort.) The retorts $h$, $h$, and their contents the chains are to be kept during the process heated to a moderate red heat. The resin, oils or fats falling upon the surface of iron and the vapors disengaged passing through the heated chains as shown by the direction of the arrows at Fig. 4, and Fig. 1, becomes decomposed and gives out heavy carbureted hydrogen gas containing from 30 to 40 per cent. of olefiant gas. The gas thus formed is immediately conveyed down through the exit pipes $k$, $k$, Fig. 2 into the hydraulic main $g$, below, Fig. 2 where it mixes with the hydrogen, oxid of carbon, and light carbureted hydrogen gases produced from the water, the mixed gases then pass through the pipe $m$ through the ordinary condensing pipes $n$, $n$, and thence into a gasometer which may be of the ordinary kind. The retorts $a$, $b$, Fig. 1 and $h$, $h$, Fig. 2 are heated by means of the furnace $o$, $o$, Figs. 1 and 2 the flues passing upward and downward against the perpendicular retorts then over the horizontal retorts as indicated by the arrows and dotted lines in Fig. 2, there is no peculiarity in the construction or mode of fixing them.

The heat must however be raised and during the process hereinafter described kept up to such a degree as to maintain the charcoal or coke or anthracite coal and thin pieces of iron plates or iron wires contained in the retorts at a good red heat and the iron chains contained in the horizontal retorts at a moderate red heat. The iron plates used should be in order to operate to the greatest advantage thin flat pieces of hoop iron, pieces of boiler plates or other thin surfaced iron and about two inches long or if iron wires are used they should be of small diameter say about one tenth of an inch and from three to four inches long.

I have already mentioned that the retorts $a$, and $b$, and their contents are to be kept during the process at a good bright red heat by the fire placed in the furnace $o$, Figs. 1 and 2. The retorts $h$, $h$, and their contents Figs. 1 and 2, at a moderate red heat also by the same furnace $o$, Figs. 1 and 2. The furnace work is built of fire brick and the fire flames upward and around the whole of the retorts through the flues surrounding them as shown by the arrows in Fig. 2. The retorts are sufficiently supplied with drafts of air through the ash pit beneath the furnace. The charcoal or coke or anthracite coal and iron plates or wires contained in the retorts $a$, and $b$, Fig. 1 are replaced as occasion requires through the openings $p$, $p$, $p$, Figs. 1 and 3 at the upper ends of the retorts previous to and during the process hereinbefore described of manufacturing gas those openings are closed by caps cemented with fire clay into the necks of the retorts and fastened down by means of clamps and screws shown at $q$, $q$, Fig. 1 the same is required for the retorts $h$, $h$, Fig. 2, when the chains or pieces of iron or other metal employed require being taken out to remove any incrustation of carbon that may be formed on them during the manufacture of the gas.

I will now describe the process for preparing the heavy carbureted hydrogen from pit coals. In this case such pit coals only should be selected as shall be rich in carbon and olefiant gas. The retorts $h$, $h$, Fig. 2 are charged with this pit coal (in place of the chains) by placing thin layers of this pit coal on the division of the retort shown at $i$, $i$, Figs. 2 and 4 and also on the bottom part of these retorts taking care to allow sufficient room for the disengaged gases to escape. The retorts are heated in the same way as that for generating gas from resin oils or fats &c. but instead of a moderate red heat being employed a white red heat should be used. The gas disengaged from the coals passes through the exit pipes $k$, $k$, into the hydraulic main $g$, thence through the condensing pipes $n$, $n$, into the ordinary purifying vessels containing lime as in the ordinary process of coal gas making. The coke remaining in the retort should be removed every three or four hours. The gas so prepared should be mixed with hydrogen oxid of carbon and carbureted hydrogen gas produced by the decomposition of water as in the process hereinbefore mentioned in the proportion of 400 parts of the above mentioned gases from water to every 600 parts of the heavy carbureted hydrogen produced from coals. Or if resin, tar, oils, fats or such before mentioned substances be employed then 500 parts of hydrogen, oxid of carbon and carbureted hydrogen gases produced by the decomposition of water and 500 parts of the heavy carbureted hydrogen from resin &c. should be mixed together.

The gas should be tested on its way to the gasometer by means of a test burner if the gas burns with a red smoky flame more hydrogen &c., from water should be employed in the manufacture, but if on the contrary the gas burns with a weak blue flame then more of the heavy carbureted hydrogen should be used.

The drawings hereto annexed are on a scale of one and a half inches to the foot which may be decreased or increased according to the size of the works required.

If a small quantity of gas only be required say 1,000 cubic feet per diem then two retorts will be sufficient, one for the production of hydrogen, &c., and the other for the production of the carbureted hydrogen gas.

$r$, $r$, $r$, Figs. 1, and 2, are coverlids at the lower ends of the retorts $a$, and $b$, Fig. 1, respectively made to open to remove the oxidized iron out of the said retorts and such coverlids should be cemented with fire clay when replaced.

S, S, Fig. 2, are two siphon pipes leading from the hydraulic main $g$, and the condensing pipes $n$, $n$, into the pan $t$, to remove the collection of oily or other matter deposited during the manufacture of gas. The chains employed in the horizontal retorts $h$, $h$, Fig. 2, should be in small links varying from half an inch to one inch across the narrowest part. The retorts must of course be heated up to the temperature directed before letting in the resin, oil, or fat.

The protection between the quantity of water and the quantity of resin oil or fats &c., let into the apparatus while the process is going on will vary according to the quality of the material used for producing the heavy carbureted hydrogen. If such material contains too much carbon in proportion to its hydrogen &c., more water will be required to produce the ultimate compound gas and vice versa, and particularly ascertained by means of the test burner before mentioned.

I will now describe the gasometer and the method in which it is prepared as adapted to hold from 100 to 2,000 cubic feet of gas.

$u$, $u$, Fig. 5 represents a round dish or basin like vessel made of sheet iron and is from eighteen inches to two feet deep which is nearly filled with water.

$v$, $v$, is a round top (of less diameter than the basin) made of pine wood with a marginal hoop running around its side of about three inches diameter. The sides $w$, $w$, of the gas holder should be made of flexible material and perfectly air tight and the material I find best for this purpose are two surfaces of fine strong calico prepared with dissolved india rubber and the two surfaces so prepared should be compressed together as in the ordinary mode of making air tight cloths and made secure shaped and fixed to the sides of the top $v$, $v$, with india rubber paste, coal naphtha, or spirits of turpentine and when the gas-holder is formed it should be painted over with a quick drying oil and litharge boiled together or other suitable covering.

$x$, $x$, are the inlet and outlet tubes. $y$, $y$, regulating wheels affixed to the top of the gas holder. $z$, $z$, a hoop of iron placed around the bottom part of the holder and secured to the basin $u$, $u$. The gas holder on being emptied folds inside the tank or basin $u$, $u$, and the gas is made secure by means of the water beneath.

Having now described the apparatus and mode of operation used by me for carrying into effect my improvements in the manufacture of gas it remains for me to state what I claim as my invention. And I hereby declare that I do not claim generally the use of water as a material from which to produce gas, nor the use of charcoal or coke or anthracite coal separately as a material to be used as the agent for a decomposing water and producing hydrogen oxids of carbon and light carbureted hydrogen gas, but

I claim and limit my claim to the following particulars (that is to say.)

1. I claim the method which I have described of producing hydrogen gas oxid of carbon gas and light carbureted hydrogen gas combined freed or nearly freed from the presence of carbonic acid gas by passing the gas evolved by the decomposition of water through a mass of materials consisting of charcoal, coke or anthracite coal in combination with thin iron plates, or iron wires or iron turnings heated to a high temperature such compound gas produced as aforesaid being combined with heavy carbureted hydrogen gas produced by the decomposition of resin, oil, fat, or pit coal or such other substances as are hereinbefore designated, and described, but I do not claim the modes herein described of decomposing the water.

2. I claim the use of small chains or other similarly connected pieces of metal as a means of presenting a large amount of iron surface for decomposing the resin, tar, oil or fats or other such substances hereinbefore designated such chains or other similar united pieces of metal being so arranged as to expose the vapors disengaged from the above mentioned substances to a multitude of small divided and heated surfaces.

STEPHEN WHITE.

Witnesses:
 JOHN DAVIES,
 THOMAS SAWYER.